(12) United States Patent
Kong

(10) Patent No.: US 6,275,186 B1
(45) Date of Patent: Aug. 14, 2001

(54) DEVICE AND METHOD FOR LOCATING A MOBILE STATION IN A MOBILE COMMUNICATION SYSTEM

(75) Inventor: Seung-Hyun Kong, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/459,052

(22) Filed: Dec. 10, 1999

(30) Foreign Application Priority Data

Dec. 10, 1998 (KR) .............................................. 1998-54143

(51) Int. Cl.[7] .............................. G01S 3/02; H04Q 7/00; H04B 1/00
(52) U.S. Cl. .......................... 342/363; 342/357; 455/456; 455/404
(58) Field of Search .................................... 342/463, 464, 342/450, 457; 455/456, 404

(56) References Cited

U.S. PATENT DOCUMENTS 6,195,559 * 2/2001 Reudink et al. ..................... 455/456

* cited by examiner

Primary Examiner—Thomas H. Tarcza
Assistant Examiner—Fred H Mull
(74) Attorney, Agent, or Firm—Dilworth & Barrese, LLP

(57) ABSTRACT

A device and method for locating a mobile station (MS) in a mobile communication system. In the MS locating device for an MS which receives signals synchronized to a predetermined time from at least one adjacent base station (BS) and is located within a serving BS of the at least one BS, an analog to digital converter (ADC) converts the received BS signals to digital chip sample data, a memory stores the chip sample data, a dedicated searcher detects at least two signals by correlating the chip sample data received from the memory by off-line processing and calculates the signal-to-interference ratios (SIRs) and time difference of arrival (TDOA) of the two signals, and a controller estimates the MS location based on the SIRs and TDOA received from the dedicated searcher.

30 Claims, 9 Drawing Sheets

DEVICE AND METHOD FOR LOCATING A MOBILE STATION IN A MOBILE COMMUNICATION SYSTEM

PRIORITY

This application claims priority to an application entitled "Device and Method for Locating Position of Mobile Station in Mobile Communication System" filed in the Korean Industrial Property Office on Dec. 10, 1998 and assigned Ser. No. 98-54143, the contents of which are hereby incorporated by reference.

BACKGROUND OF THE INVENTION

1. Field of the Invention

The present invention relates generally to the field of wireless communications, and in particular, to a device and method for locating the position of a mobile station (MS) in a mobile communication system.

2. Description of the Related Art

The FCC (Federal Communication Commission) of the U.S. provides that an MS locating service should be implemented for emergency 911 (E911) with a probability of 67% within an error of 125 m or below by October of 2001. Therefore, the CDMA (Code Division Multiple Access) standard (TIA/EIA/IS-95) as well as the IMT-2000 (International Mobile Telecommunication-2000) system makes efforts to provide the MS locating service with use of a reverse link function called "PUF (Power Up Function)". The PUF is an MS locating scheme in which an MS in an emergency situation transmits probes with gradually increased power to a plurality of adjacent base stations (BSs) on a reverse channel to inform them of its position so that each of the BSs can calculate the distance between the BS and the MS by estimating the time taken for the signal to reach the BS. The PUF is provided in IS-95B.

Implementation of the PUF, however, increases interference and, as a result, decreases system performance. To overcome the problem, the present invention provides an MS locating method for continuous positioning. The MS locating scheme operates on the principle that an MS receives an active pilot and other neighbor pilots on a forward link channel and estimates its relative position from the neighbor BSs in a CDMA communication system. In addition, relative MS positions from at least three BSs are determined by use of at least two time differences of arrival (TDOAs) of signals received from the BSs. In the present invention, the TDOA and SIR (Signal-to-Interference Ratio) of each BS channel are measured to efficiently determine the position of the MS in a CDMA communication system synchronized to the GPS (Global Positioning System).

SUMMARY OF THE INVENTION

It is, therefore, an object of the present invention to provide a device and method for locating an MS by measuring the TDOAs and SIRs of forward pilots received from neighbor BSs in a mobile communication system operated in synchronization.

It is another object of the present invention to provide a device and method for locating an MS using a dedicated searcher in a mobile communication system.

Briefly, these and other objects can be achieved by providing an MS locating device for an MS. The MS receives signals synchronized to a predetermined time from at least one adjacent BS and is located within a serving BS service area of at least one BS. In the MS locating device, an analog to digital converter (ADC) converts signals received from BSs to digital chip sample data, a memory stores the chip sample data, a dedicated searcher detects at least two signals by correlating the chip sample data received from the memory by off-line processing and calculates the signal-to-interference ratios (SIRs) and time difference of arrival (TDOA) of the two signals, and a controller device controls the dedicated searcher to obtain a better estimate of SIRs and TDOAs.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described hereinbelow with reference to the accompanying drawings. In the following description, well-known functions or constructions are not described in detail since they would obscure the invention in unnecessary detail.

The following description is conducted with the appreciation that while a forward pilot channel is described as the medium for measuring the distance between a BS and an MS in the present invention, it is an exemplary embodiment. Obviously, channels shared by all or some MSs are candidates, such as an auxiliary pilot channel, a synchronization channel, and a paging channel provided in the current IS-95 system.

Figure 1:
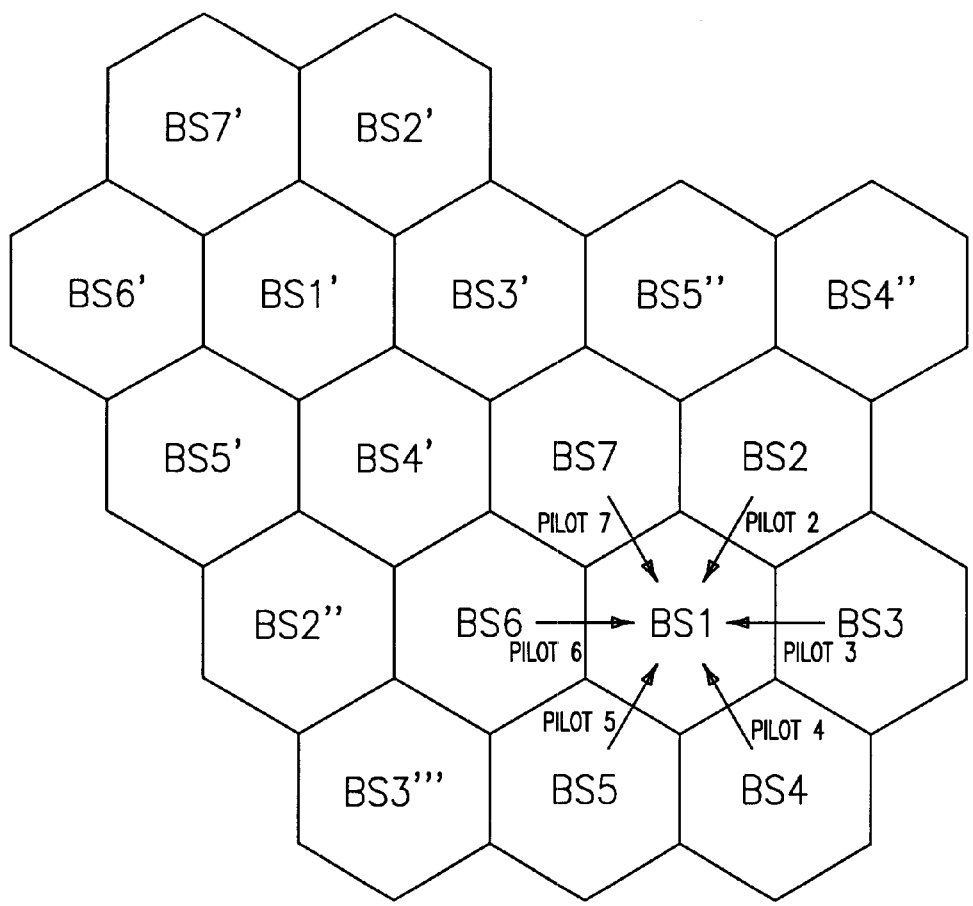
FIG. 1 illustrates hexagonal-shaped cells a serving BS among which is located at the center and surrounded with six BSs.

The concept of an embodiment of the present inventionI is that optimal unencoded forward pilot channel data is used in locating an MS, referring to its timing and phase. The MS locating method of an embodiment of the present invention is applicable to both need-based positioning and continuous positioning. The location of an MS can be determined when either the MS or a BS requests. In addition, the system and the MS can support it for navigation service. Regular hexagonal-shaped cells are given as the MS-BS geographical model, with one serving BS, in this case BSI, surrounded with six BSs as shown in FIG. 1.

To determine its location, an MS should receive pilot signals with measurable SIRs from a plurality of BSs including the serving BS, BS1. Yet, when the MS is near to the serving BS or another BS, the MS cannot receive pilot signals with sufficient SIRs from other BSs since the signal transmitted from the nearby BS interferes with the pilot signals from other BSs. The SIR of a forward pilot signal P1 received in the MS at a specific distance from BS1 is generally expressed as $$(E_c/I_t) \mid p_1 = \frac{\beta \times p1 \times L(d1)}{[p1 \times L(d1) + \sum (p_i \times L(d_i))]} \quad i = 1, 2, 3... \quad (1)$$

where $\beta$ is the ratio of pilot transmission power to the overall transmission power of BS1, $P_1$ is the overall forward transmission power of BS1, $P_i$ is the forward transmission power of BS i, $d_i$ is the distance between the MS and BS i, generally expressed as $L(d_i)=C*d_i^{-4}$, and C is a constant value. The SIR of $P_i$ (–i=1, 2, 3, . . .) received in the MS at the specific location can be estimated from Eq. 1. Reversely, the SIR of each pilot signal at every location on the ground can be estimated for the MS at the specific location, using the SIRs and location information of adjacent BSs, the PN offset, direction, and angle of each sector, and geographical signal attenuation factors. The location of the MS can be determined by comparing the estimated SIRs with SIRs actually measured by the MS.

An MS locating method using SIRs will be described in detail hereinbelow.

An MS calculates the TDOA and SIR of each of the pilot signals received at a time when the location of the MS is to be determined. Here, TDOA is defined as the difference between arrival times of two BS synchronized signals (e.g. pilot signals) at a specific MS. The forward pilot TDOA and SIR are measured by a searcher, available in a present IS-95 CDMA MS. However, since the IS-95 CDMA MS searcher can measure the TDOA and SIR of one pilot signal at one time, the reference time may be changed due to a change in the radio propagation path of an active pilot signal which provides the reference time to the MS, when it attempts to measure those of the next pilot signal.

To solve the resulting inaccurate measurement of TDOAs, the MS stores all received signals and calculates the TDOA and SIR of each pilot signal by off-line processing in an embodiment of the present invention. Basically, the MS location can be determined with at least three BS signals. Acquisition of at least three BS signals by off-line processing at an MS having a dedicated searcher will be described.

Figure 2A:
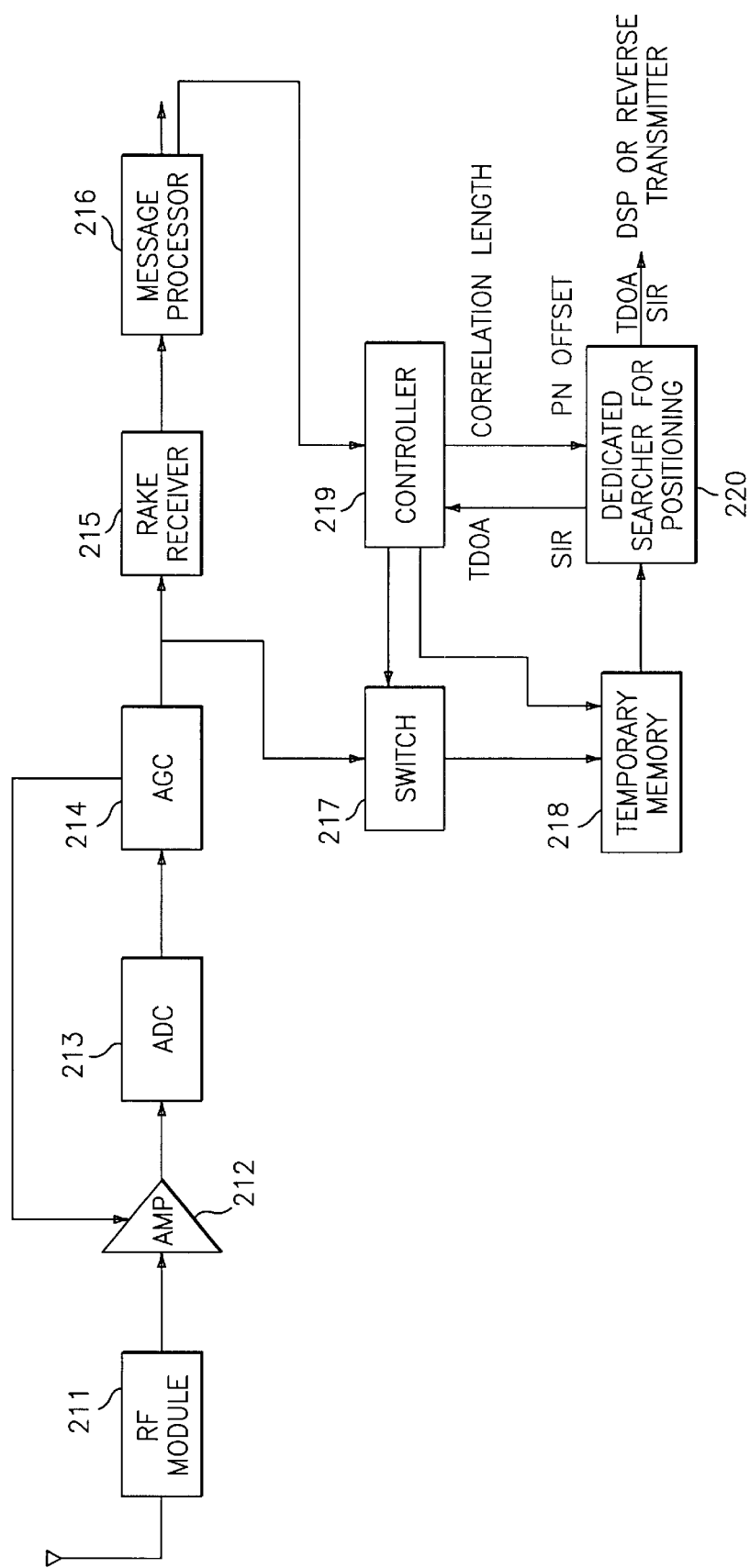
FIG. 2A is a block diagram of an MS receiver having a dedicated searcher for MS positioning according to a first embodiment of the present invention.

In an MS receiver as shown in FIG. 2A, the output of an AGC (Automatic Gain Controller) 214 is stored in a temporary memory 218, and a dedicated searcher 220 calculates TDOAs and SIRs from the stored data by off-line processing. For continuous positioning in an embodiment of the present invention, received chip sample data is stored in a temporary memory and TDOAs and SIRs are continuously calculated from the chip sample data. Assignment of the dedicated searcher implies that another searcher can be added for the MS positioning service, besides a searcher for supporting a rake receiver used in an existing IS-95 MS. A correlation integration time (hereinafter, referred to as correlation length) for the MS positioning in the dedicated searcher 220 is adjusted to an intended value under the control of a controller 219 to detect the phase of a corresponding pilot signal for calculation of its TDOA in the dedicated searcher 220. To do so, the dedicated searcher 220 increases the correlation length in a serious interference area, to thereby detect even the phase of a pilot signal with a low SIR. That is, the increase of correlation length enables detection of the phase of a pilot signal with a low SIR or a pilot signal experiencing too much interference.

A method of determining an MS location from three measured TDOAs already exists in a mathematical "closed form solution". The MS location determined by this mechanism, however, may be inaccurate since a pilot signal (pilot signals) of a BS (a plurality of BSs) reaches an MS with multipath components. The multipath propagation becomes a serious error in MS positioning. It is difficult to compensate for the multipath propagation delay error and to estimate how those delay errors are involved in the determination of the MS location in the above calculation scheme using TDOAs. In addition, the MS positioning has continuous error components due to intermittent, instantaneous, or continuous reception of a multipath signal component. Therefore, an embodiment of the present invention utilizes the SIR of a pilot signal to increase the reliability of TDOA-based MS positioning. Theoretically, the SIR of a pilot signal transmitted from each BS varies depending on the location of an MS and represents one fixed MS location and thus the MS location can be determined by measuring the SIRs of pilot signals transmitted from a plurality of BSs.

In the real world, an SIR at a specific MS location is neither equal to a theoretical SIR nor constant. In the MS locating method using SIRs according to an embodiment of the present invention, the SIR of a received pilot signal is filtered by a specific filter (e.g, averaging filter, or filter which sets an upper or lower limit), the distance between an MS and each BS is calculated, and the MS location is estimated based on the SIR and the distance. Then, the MS location is finally determined by comparing the MS location estimated by the SIR (SIR location) and that estimated by the TDOA (TDOA location). Consequently, the TDOA-based MS locating method becomes reliable.

The MS location determining method of an embodiment of the present invention can be considered in two aspects. First, in order to determine the TDOA location, the PN offset of a pilot signal with an SIR greater than an SIR threshold, the position of a BS transmitting the pilot signal, and the TDOA of the pilot signal are obtained and then a relative MS position with respect to the BS is calculated. On the other hand, to make the SIR-based positioning viable, an SIR distribution of a pilot signal with an SIR greater than an SIR threshold directed from a BS should be detected using all factors except for fading varying a pilot SIR, including the PN offset and TDOA of the pilot signal, the position and antenna height of the BS, the direction and beam width of a sector antenna in the case of the sector antenna, and geographical signal attenuation information. Here, fading effects can be reduced by averaging over a predetermined time period. Then, the distance between the MS and the corresponding BS is calculated using the SIR of the pilot signal at a specific position and the relative positions of the MS with respect to adjacent BSs are determined from the calculated distance.

The final position of the MS is determined from the thus-obtained TDOA and SIR locations. The final MS location determination can be achieved by many algorithms:

(1) The final MS position is determined by taking the mean value of an average SIR location and an average TDOS location;

(2) The final MS location is determined by using the inverse of variance of locations with TDOAs and that with SIRs as weights for the averaging operation;

(3) The inverse of standard deviations are substituted for the weighting values in (2); and (4) The difference between the TDOA location and the SIR location is calculated, the reciprocal of the difference is given as a weight to an average TDOA location and an average SIR location, thereby calculating the final position.

In the approaches (2), (3), and (4), a small weight is assigned in calculation of the final position when the two measured locations differ a lot and a large weight in calculation of the final position when they are close.

An embodiment of the present invention basically provides an MS locating method when an MS measures the strengths of three different BS pilot signals. That is, the MS should be capable of receiving pilot signals with enough SIRs from at least three BSs, which is impossible in many areas. Therefore, an embodiment of the present invention also suggests a MS locating method wherein the position of an MS can be determined even in the worst case where only two pilot signals are acquired. The probable locations of the MS calculated from one TDOA produced using two different BS pilot strength measurements form a parabola between the two BSs. The two pilot SIRs measured by the MS are different at any location on the parabola. Hence, a reliable final SIR location is obtained by filtering SIR locations resulting from the two SIRs. Then, the MS location is determined by detecting a location on the parabola which best matches the final SIR location.

When a BS transmits two pilot signals with SIRs greater than an SIR threshold, a TDOA cannot be calculated from the two pilot signals. In this case, an MS is located utilizing SIRs and round trip delays (RTDs). That is, if two pilots are received from the same BS, this implies that the MS is within the intersection area of the BS sectors. The direction of the MS from the BS is determined from an average of the SIRs of the two pilots. Then, the final position of the MS is determined using the MS direction and the RTDs.

FIG. 2A is a block diagram of an MS receiver according to a first embodiment of the present invention, for temporarily storing forward channel data and determining an MS location by use of a dedicated searcher.

Referring to FIG. 2A, an RF (Radio Frequency) module 211 downconverts an RF signal received through an antenna to an IF (Intermediate Frequency) signal and then converts the IF signal to a baseband signal. An amplifier 212 amplifies the output of the RF module 211 to be suitable for a dynamic range of an ADC (Analog-to-Digital Converter) 213 under the control of an AGC 214. The ADC 213 converts the output of the amplifier 212 to a digital signal through sampling and quantization. The output data of the ADC 213 is chip sample data. The AGC 214 controls the gain of the amplifier 212 to maintain the range of the output signal of the amplifier 212 at a predetermined level. A rake receiver 215 despreads multipath signals received from the AGC 214 and combines the despread signals. A message processor 216 decodes the output of the rake receiver 215 to recover the original. Here, control data is applied to a controller 219. The controller 219 processes the recovered message data received from the message processor 216 and provides overall control to the MS. For example, the controller 219 controls a switch 217 at a measuring requested time for positioning the MS, assigns an address to store the chip sample data in the temporary memory 218 by the switch 217, and then controls the stored chip sample data to be transferred to a dedicated searcher 220 which calculates a TDOA and an SIR for MS positioning. The switch 217 is switched to apply the output data of the AGC 214 to the temporary memory 218 under the control of the controller 219. The temporary memory 218 stores the forward channel data (i.e., chip sample data) received through the switch 216 at a corresponding address and then feeds the stored data to the dedicated searcher 220 under the control of the controller 219. The dedicated searcher 220 correlates the chip sample data received from the temporary memory 218 using a correlation strength and a PN offset received from the controller 219, calculates the SIRs and TDOAs of forward pilot signals with SIRs greater than the SIR threshold, and feeds the calculated SIRs and TDOAs to the controller 219. The SIRs and TDOAs are supplied to a digital signal processor (DSP) for the MS to estimate its location or to the reverse transmitter for a BS to estimate the MS location.

Figure 2B:
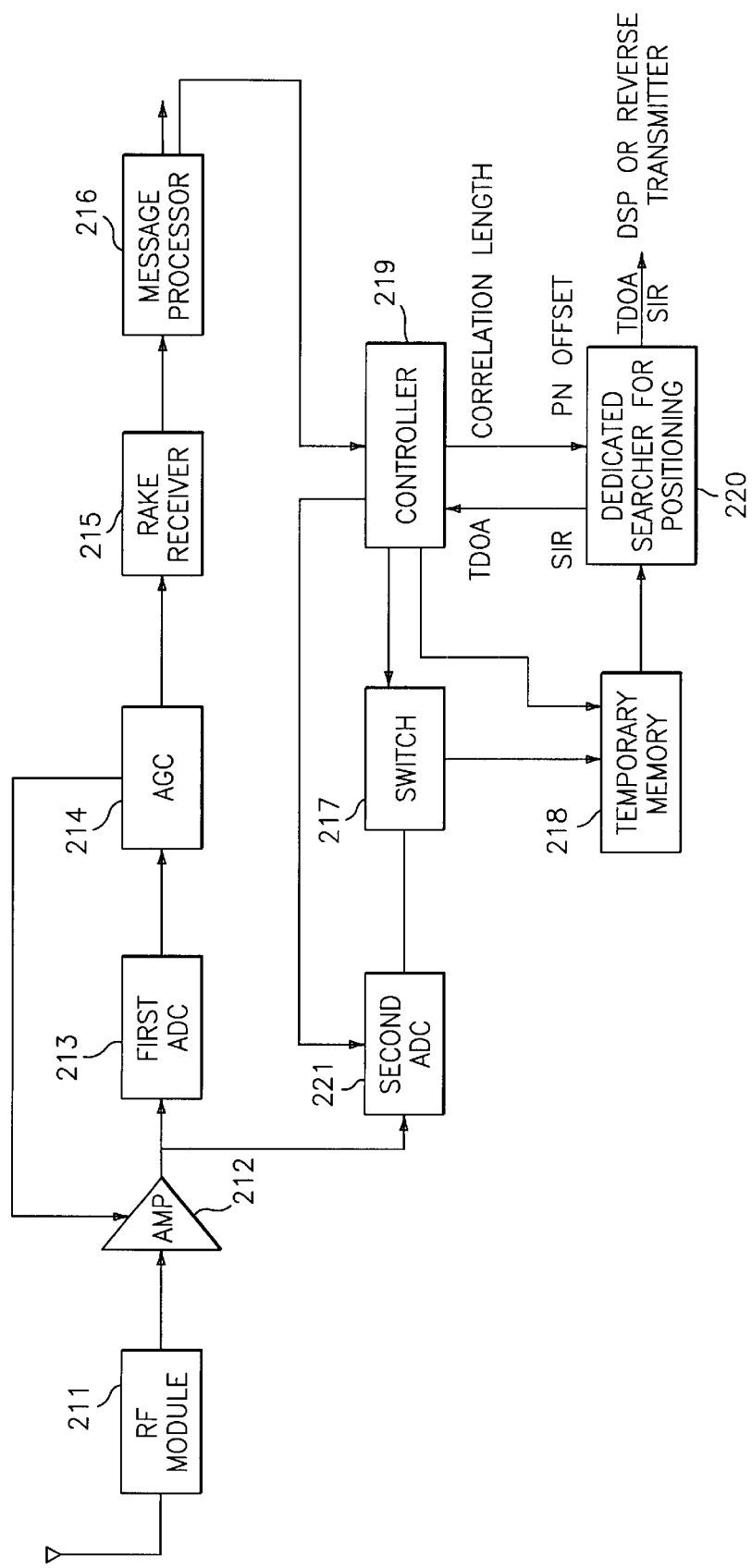
FIG. 2B is a block diagram of an MS receiver having a dedicated searcher for MS positioning according to a second embodiment of the present invention.

FIG. 2B is a block diagram of an MS receiver further including a second ADC 221 in addition to the components shown in FIG. 2A, according to a second embodiment of the present invention.

Referring to FIG. 2B, a second ADC 221 controls the number of quantization levels under the control of the controller 219 to accurately detect a pilot signal with a very low SIR. A conventional MS neglects the need for the additional ADC, but the additional ADC is a requirement for an MS using a positioning dedicated searcher which measures a plurality of pilot strengths. The controller 219 controls the quantization level number (i.e., quantization unit) of the second ADC 221 based on the measured SIR of an active pilot. As the SIR of the active pilot increases, the controller 219 increases the quantization level number. For example, the MS can set the output of an ADC to a conventional 4 bits and the quantization level number of the second ADC to 16, according to the second embodiment. However, if a BS pilot signal other than the active pilot has a signal amplitude of a half of a quantization unit or below, the quantized output includes few pilot components of the BS. Therefore, the controller 220 controls the quantization level units to be more dense by increasing the bit number of the output of the second ADC 221 to 4, 8, or 16 bits or enables a pilot signal with a low SIR to be detected by setting 8, 12, or 16 bits as default. The output of the amplifier 212 directed to the second ADC 221 is controlled by the AGC 214. The output of the second ADC 221 is stored in the temporary memory 218 through the switch 217. The controller 219 obtains data received for an intended time period by controlling the switch 217.

As described above, the MS receivers according to the first and second embodiments of the present invention store chip sample data received for a predetermined time period in a temporary memory and processes the chip sample data by off-line processing in a dedicated searcher, so as to calculate TDOAs and SIRs. All input forward pilot signals are acquired from the stored chip sample data and thus the phase of an active pilot signal, which provides a reference time for an MS, can remain constant.

Here, the dedicated searcher increases a correlation length until a plurality of pilot signals with correlation peak points are detected. A stable correlation peak point refers to a point at which the dedicated searcher obtains a certain correlation peak continuously. The controller 219 adjusts the correlation length by monitoring the output of the dedicated searcher 220. The controller 219 transmits a correlation strength used to calculate the SIR and TDOA from the previous chip sample data to the dedicated searcher 220 to calculate a current TDOA and SIR from new chip sample data stored in the temporary memory 218. When the resulting correlation peak is greater than the SIR threshold, the TDOA and an SIR are calculated by correlation at a reduced correlation length. In the case that the reduced correlation length almost satisfies the SIR threshold, the controller 219 uses this correlation length in calculating the TDOA and SIR from the next chip sample data. This method reduces MS power dissipation and allows rapid MS locating when the MS positioning is performed in relatively short time intervals.

Figure 3A:
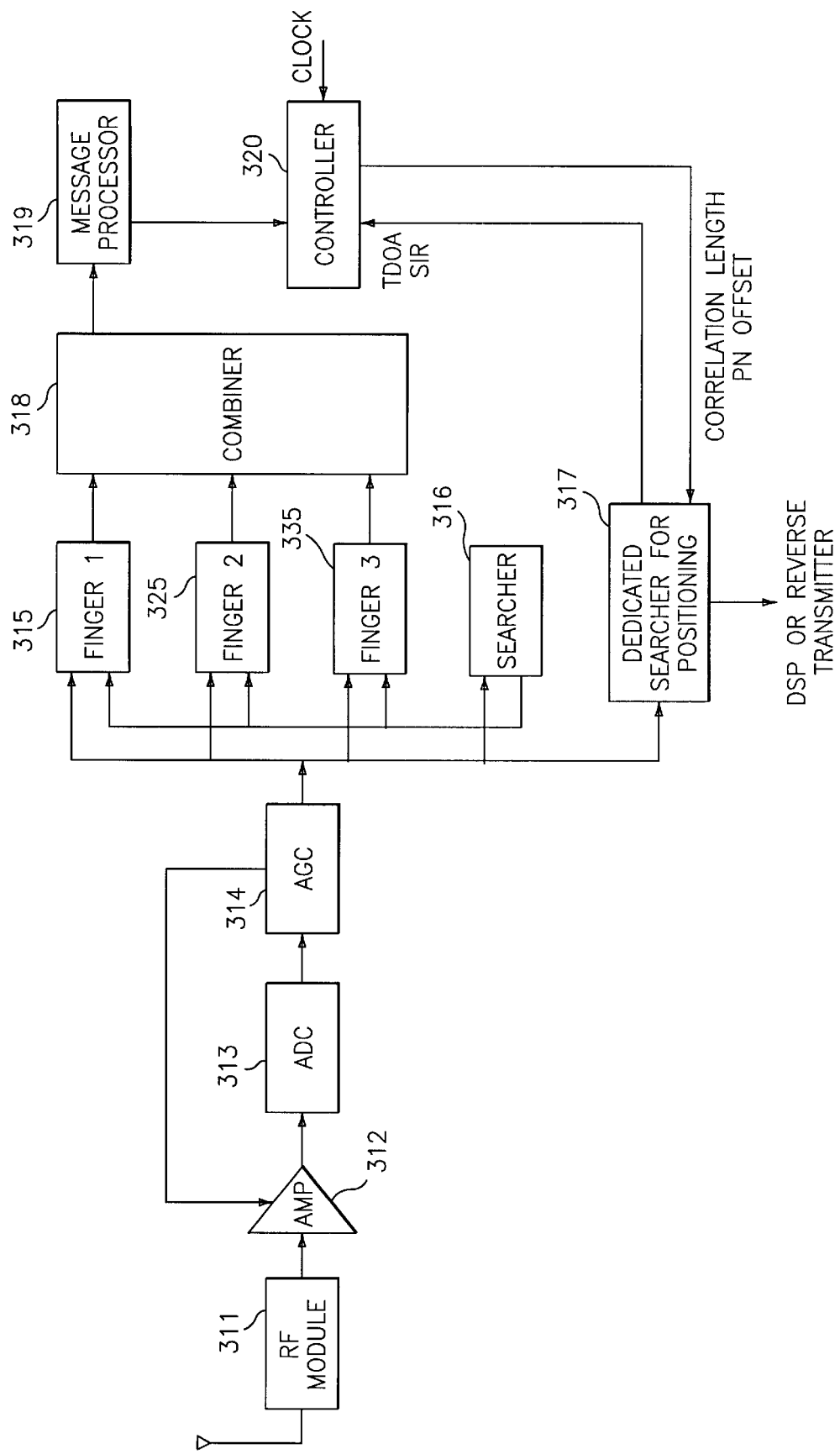
FIG. 3A is a block diagram of an MS receiver having a dedicated searcher for MS positioning according to a third embodiment of the present invention.

FIG. 3A is a block diagram of an MS receiver for continuous positioning according to a third embodiment of the present invention.

Referring to FIG. 3A, an RF module 311 downconverts an RF signal received through an antenna to an IF signal and then converts the IF signal to a baseband signal. An amplifier 312 amplifies the output of the RF module 311 to be suitable for a dynamic range of an ADC 313 under the control of an AGC 314. The ADC 313 converts the output of the amplifier 312 to a digital signal through sampling and quantization. The AGC 314 controls the gain of the amplifier 312 to maintain the range of the output signal of the amplifier 312 at a predetermined level. Fingers 315 to 335 receive signals of corresponding phases and despread the received signals. A searcher 316 searches the received signal, while changing its phase, and feeds a measured phase to the fingers 315 to 335. A combiner 318 combines signals received from the fingers 315 to 335. A message processor 319 decodes the output of the combiner 318 to recover the original data. Here, control data is applied to a controller 320. The controller 320 processes the recovered message data received from the message processor 319 and provides overall control to the MS. The controller 320 feeds a correlation length and a PN offset to a dedicated searcher 317 to measure the strengths of at least three BS forward pilots. The dedicated searcher 317 correlates the forward pilot signals using the correlation length and the PN offset, calculates the SIRs and TDOAs of forward pilot signals with SIRs greater than the SIR threshold, and feeds the calculated SIRs and TDOAs to the controller 320.

Figure 3B:
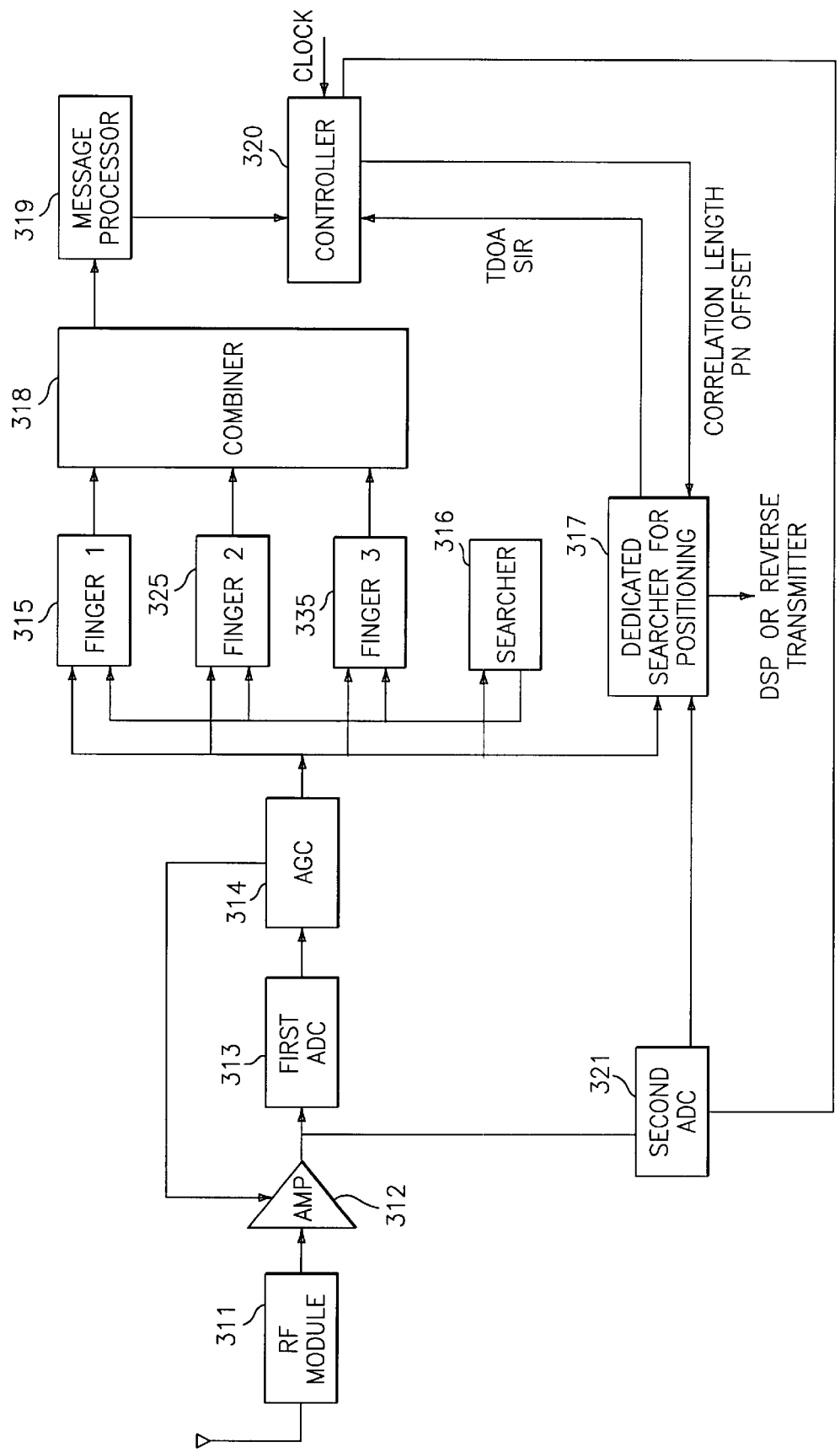
FIG. 3B is a block diagram of an MS receiver having a dedicated searcher for MS positioning according to a fourth embodiment of the present invention.

FIG. 3B is a block diagram of an MS receiver further including a second ADC 321 in addition to the components shown in FIG. 3A, according to a fourth embodiment of the present invention.

Referring to FIG. 3B, the second ADC 321 is used for obtaining the quantized output of a neighbor pilot with a low SIR, like the second ADC 221 of FIG. 2B. The ADC 321 changes a quantization level based on the SIR of an active pilot or sets a quantization level of 4 or more bits (e.g., 8, 12, and 16 bits) from the beginning.

As described above, the MS receivers shown in FIGS. 3A and 3B are different from the current CDMA MS receiver in that the former further includes a rake receiver structure (three fingers and one searcher) for a call in the conventional sense of the word, and a dedicated searcher for detecting a plurality of forward pilot signals. In this case, the switch and the temporary memory shown in FIGS. 2A and 2B are not necessary. However, since a dedicated searcher detects one forward pilot signal at one time in an MS as constituted shown in FIG. 3A or 3B, the phase of an active pilot signal can be changed while the correlation peak points of other pilot signals are being detected, resulting in inaccurate TDOAs. Then, the controller monitors the output of the dedicated searcher so that the dedicated searcher does not correlate all the pilot offsets in a neighbor list but only 5–6 pilot signals with high SIRs. Consequently, TDOAs can be calculated almost at the same time.

Figure 4:
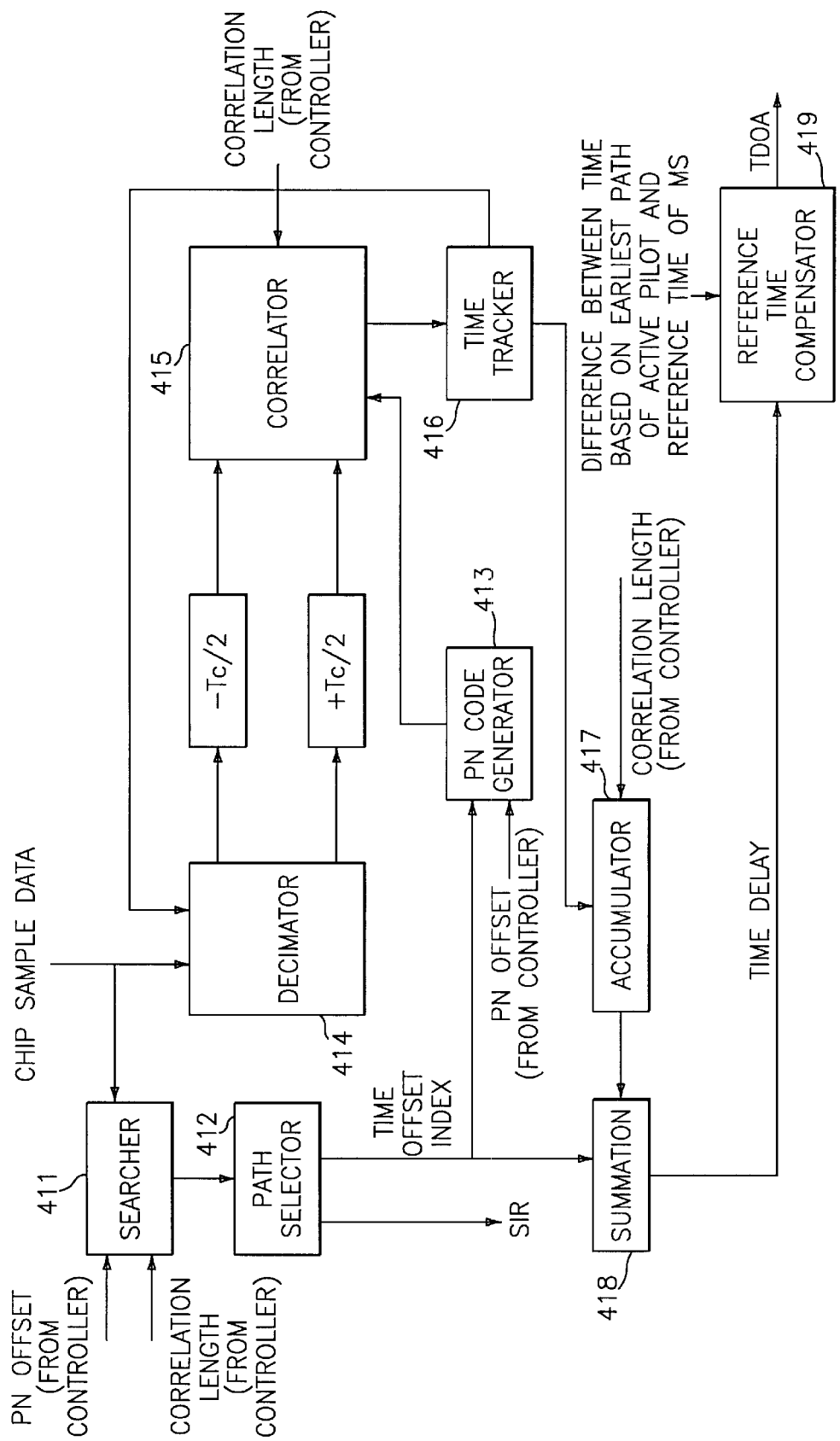
FIG. 4 is a block diagram of a dedicated searcher for an MS, which is designed to act as both a searcher and a time tracker to accurately measure TDOAs according to an embodiment of the present invention.

FIG. 4 is a block diagram of a dedicated searcher for the MS receivers shown in FIGS. 2A to 3B.

The dedicated searcher of FIG. 4 can be newly configured or modified from an existing searcher by adding a time tracker block to the components of the existing searcher to minimize the time resolution error of a TDOA. Or the dedicated searcher is so constituted that it can detect pilots again in ⅛ or smaller chip units with respect to the earliest path peak exceeding an SIR threshold after coarse acquisition, that is, pilot detection in ½ or 1 chip units, performed in the conventional searcher. In the present invention, a searcher block performs coarse acquisition and then a time tracker performs a fine resolution search. While the time tracker is searching for an optimal TDOA, the searcher block can search for a pilot signal with another pilot PN offset. The advantage of this scheme is that time required for detecting an optimal TDOA from one pilot is reduced as compared to the ½ and ⅛ chip pilot search design on the condition of the same hardware complexity.

Referring to FIG. 4, a searcher 411 performs the same function as an existing searcher, except that it does not classify a predetermined number of high correlation peaks but stores all correlation peaks greater than the SIR threshold. That is, the searcher 411 detects the peaks of searched pilot signals and outputs the time offset indexes (time delays) and SIRs of the peaks. Here, the time offset index refers to the propagation delay of a signal at an MS from its reference time.

A path selector 412 detects a time offset index corresponding to the earliest path among the time offset indexes received from the searcher 411 and outputs an SIR at the time point corresponding to the time offset index. The time offset index with the earliest path may be different from the offset index of an active pilot which provides a reference time to an MS, and its difference is compensated for when a TDOA is finally output.

A PN code generator 413 generates a PN code of a corresponding pilot signal based on the time offset index received from the path selector 412. This procedure is the same as the conventional process in which a conventional finger receives an offset index from a searcher and generates a PN code of a corresponding pilot signal according to the time offset index.

A decimator 414 outputs a ½ chip ($T_c/2$) early sample and ½ chip ($T_c/2$) late sample with a current sampling time to modify its sampling timing for the highest correlation peak.

A correlator 415 correlates the PN code received from the PN code generator 413 to the output of the decimator 414. Since the decimator 414 outputs an early signal component and a late signal component, the correlation is performed with early signal samples and late signal samples.

A time tracker 416 receives the early signal correlation value and the late signal correlation value, calculates a time offset compensation value by ⅛ chip or smaller units, and generates the resulting compensation value as a control signal for the decimator 414. In addition, the decimator 414 adjusts a decimation point according to the output of the time tracker 416.

An accumulator 417 accumulates the time offset compensation values of the time tracker 416 and outputs the accumulation value to a summation device 418.

The summation device 418 calculates an entire time delay based on the sum of the offset index with the earliest path received from the path selector 412 and the time delay compensation value received from the accumulator 417. That is, the output of the summation device 418 is a relative TDOA value with respect to the MS reference time.

When the earliest path of the active pilot is changed and an error occurs in the reference time while the MS operates according to the serving BS or the phase of the active pilot, a reference time compensator 419 compensates for the reference time error, compensates TDOAs related with the other pilots with application of the reference time compensation, and thus outputs accurate TDOAs.

In general, a searcher detects pilot signals in this order: active ($t_0$), neighbor ($t_1+t_0$), neighbor 2 ($2*t_1+t_0$), ... neighbor N ($N*t_1+t_0$), active ($(N+1)*t_1+t_0$), neighbor 1 ($(N+2)*t_1+t_0$), neighbor 2 ($(N+3)*t_1+t_0$), ... neighbor N ($2*N*t_1+t_0$), active ($(2*N+1)*t_1+t_0$)... Here, the contents in the parentheses ( ) indicate the detection time. If the detection time of the active pilot is $t_0$ and the time at which another pilot signal starts to be detected is $t_0+t_1$, the measuring time of the $10^{th}$ pilot is $t_0+10*t_1$. Since the searcher detects pilot signals periodically/sequentially, the phase of the active pilot can be changed while neighbor pilots are detected. However, the present invention detects only a few neighbor pilots with high SIRs to obtain TDOAs almost at the same time, and the reference time compensator 419 of FIG. 4 compensates this time deviation between the current reference time and the original reference time that is obtained when detecting the active pilot signal.

Figure 5:
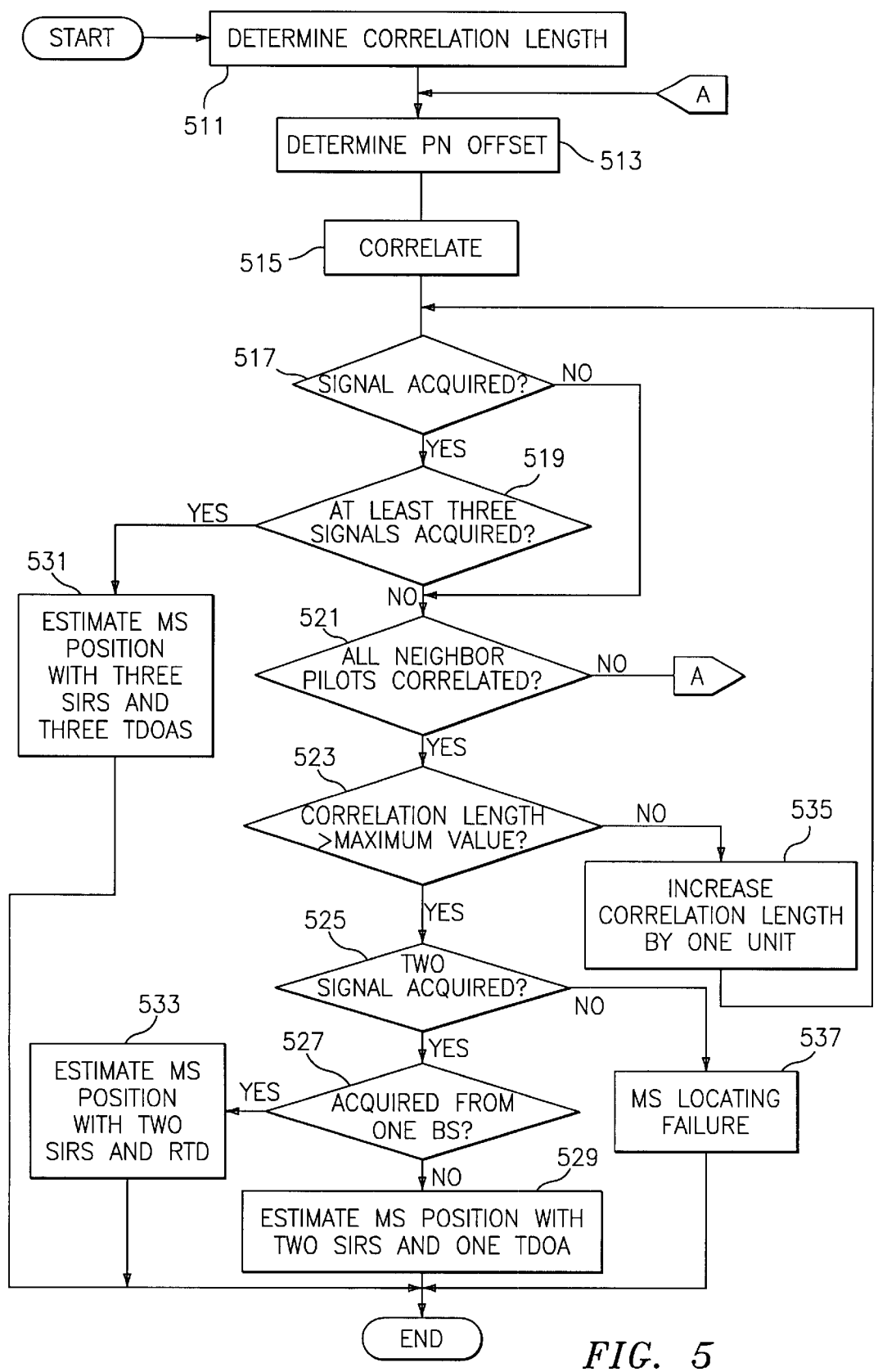
FIG. 5 is a flowchart illustrating an MS locating control operation when a dedicated searcher obtains a TDOA and an SIR according to an embodiment of the present invention.

FIG. 5 is a flowchart illustrating a control operation for an MS wherein a controller controls a dedicated searcher to locate the MS with use of a plurality of TDOAs and SIRs. While the control operation is applicable to any of the MS receivers shown in FIGS. 2A to 3B, the following description is conducted in the context of the MS receiver shown in FIG. 2A.

Referring to FIG. 5, the controller 219 determines a correlation length $N(2^{K(1)})$ for use in correlating chip sample data stored in the temporary memory 218 in step 511 and a PN offset in step 513. The correlation length was applied to the previous chip sample data and the PN offset is selected from information about neighbor BSs received from a reference BS and neighbor pilot signals with high SIRs. The dedicated searcher 220 correlates the chip sample data received from the memory 218 with the correlation length and the PN offset and outputs the resulting TDOA and SIR to the controller 219 in step 515. Here, the dedicated searcher 220 outputs only the TDOAs and SIRs of pilot signals with the SIRs greater than the SIR threshold to a DSP or a reverse transmitter under the control of the controller 219.

The controller 219 monitors the output of the dedicated searcher 220 to determine whether a pilot signal with an SIR greater than the SIR threshold has been acquired in step 517. The SIR threshold is set to a value at or greater than an interference signal correlation value determined by the correlation length. If the value is equal to or greater than the threshold, the controller 219 proceeds to step 519. If not, it goes to step 521. In step 519, the controller 219 determines whether at least three pilot signals have been acquired from different BSs. If the number of the acquired signals is at least three, the controller 219 goes to step 531. If the number of the acquired signals is less than three, the controller 219 goes to step 521.

In the case of at least three acquired signals at step 519, at least three TDOA-SIR pairs are obtained. For example, on the assumption that pilot signals i, j, and k are given and pilot signal i is an active pilot, calculated TDOAs are $tdoa_{ij}$ (arrival time of pilot signal i−arrival time of pilot signal j), $tdoa_{ik}$, and $tdoa_{jk}$, and calculated SIRs are $sir_i$, $sir_j$, and $sir_k$. Therefore, the controller 219 estimates an optimal location based on the TDOAs and SIRs in step 531. The above procedure is applied when an MS receives at least three pilot signals from different BSs. This is the first method for determining MS location.

In the case of less than three acquired signals at step 519, the controller 219 determines whether all neighbor pilot signals have been acquired (correlated), that is, whether a correlation operation is completed with PN offset values predetermined for MS positioning in step 521. If the correlation operation is completed, the controller 219 goes to step 523. If it is determined that PN offsets remain for correlation, the controller 219 returns to step 513 to correlate an input signal with another neighbor pilot PN offset.

In step 523, the controller 219 determines whether the correlation length reaches a maximum value. If there is a maximum correlation length, the controller 219 goes to step 525 and, if not, the controller 219 goes to step 535. The controller 219 increases the correlation length by one unit in step 535 and returns to step 515 for correlation.

In step 525, the controller 219 determines whether two signals with SIRs greater than the SIR threshold have been acquired. If the number of acquired signals is two, the controller 219 goes to step 527. On the other hand, if the number of acquired signals is less than two, the controller 219 performs a locating fail routine in step 537.

In the case of two detected pilot signals, the controller 219 determines whether the two signals have been received from one base station in step 527. If the two signals have been received from one base station, the controller 219 goes to step 533. If they have been received from different BSs, the controller 219 goes to step 529.

In step 529, the controller 219 estimates an optimal MS location based on one TDOA ($tdoa_{ij}$) and two SIRs ($sir_i$ and $sir_j$) obtained from the two acquired pilot signals. This is the second method for determining MS location.

If the two signals have been received from one BS in step 527, the controller 219 estimates the direction of the MS based on the SIRs received from the dedicated searcher 220 and calculates the distance between the MS and the BS utilizing an RTD calculated by the active BS, thereby estimating the final position, in step 533. This is the third MS positioning method. Here, steps 529, 531, and 533 are performed in the MS or in an upper-layer system for measuring the MS location.

As described, an MS location can be determined by three methods: (1) when at least three pilot signals are received from different BSs, as in step 531; (2) two pilot signals are detected from different BSs, as in step 529; and (3) two pilot signals are received from one BS, as in step 533.

Figure 6A:
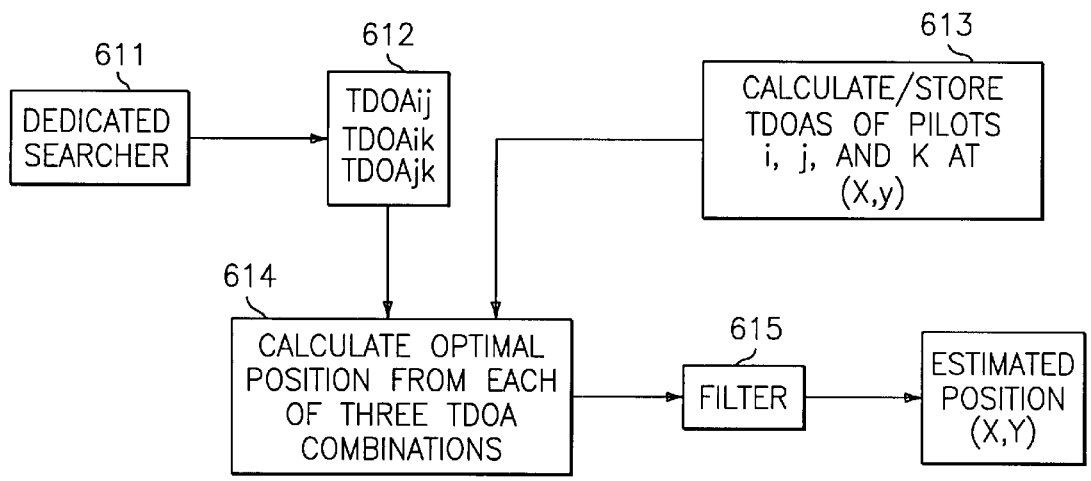
FIGS. 6A and 6B are block diagrams of an MS locating algorithm when three pilot signals with SIRs greater than an SIR threshold are acquired according to an embodiment of the present invention.
Figure 6B:
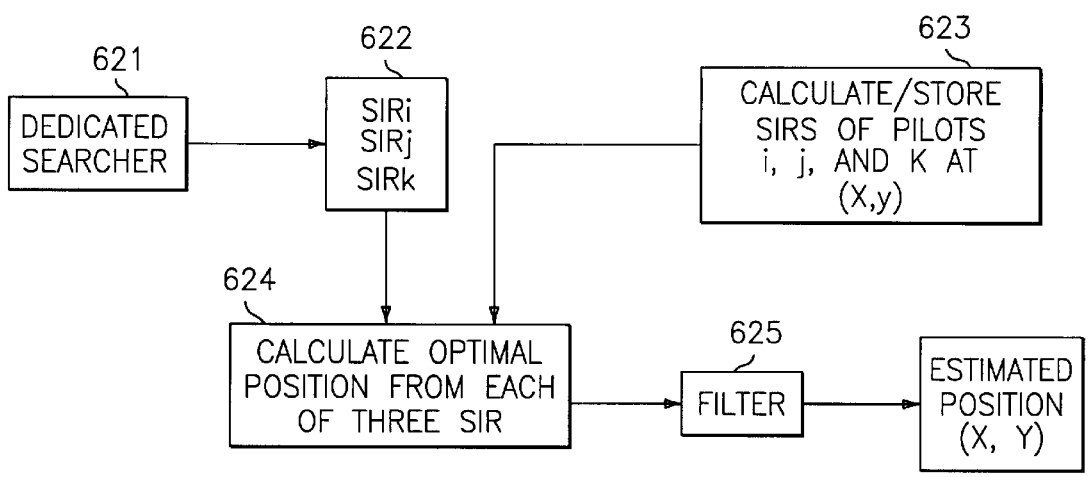

The first method will be described referring to FIGS. 6A and 6B.

First, determination of the location of an MS using three TDOAs will be described referring to FIG. 6A. A calculator 612 calculates the TDOAs $tdoa_{ij}$, $tdoa_{ik}$, and $tdoa_{jk}$ of pilot signals i, j, and k of different BSs received from a dedicated searcher 611. A storage 613 makes a TDOA map out of the TDOAs of the pilots received at positions (x, y) from the BSs located at i, j, and k. That is, TDOAs of pilots i, j, and k received in the MS at the location (x, y) are calculated and stored. Then, a comparator 614 compares three TDOA combinations ($tdoa_{ij}$, $tdoa_{ik}$), ($tdoa_{ij}$, $tdoa_{jk}$), and ($tdoa_{ik}$, $tdoa_{jk}$) with the TDOA map and obtains best matching location coordinates ($x_1$, $y_1$), ($x_2$, $y_2$), and ($x_3$, $y_3$). A filter 615 filters signals representative of the three location coordinates and obtains the final MS location (X, Y). Here, the filter is a moving average filter.

A three SIRs MS positioning method will be described referring to FIG. 6B. A calculator 622 calculates the SIRs, $sir_i$, $sir_j$, and $sir_k$ of pilots i, j, and k of different BSs received from a dedicated searcher 621. A storage 623 calculates the SIRs of each BS pilot received at any location (x, y) considering all SIR influencing factors including the location, antenna gain, and antenna height of each BS and makes a pre-calculated SIR map. A comparator 624 compares the threes SIRs with the SIR map and obtains a best matching location (x, y). A filter 625 filters the three results and obtains the final location (X, Y). Here, the filter is a moving averaging filter. The final MS location is obtained by comparing the TDOA location and the SIR location. Here, it can be further contemplated that not the TDOA location but the SIR location is filtered and the resulting TDOA and SIR locations are averaged, to thereby obtaining the final estimated MS location.

Figure 7:
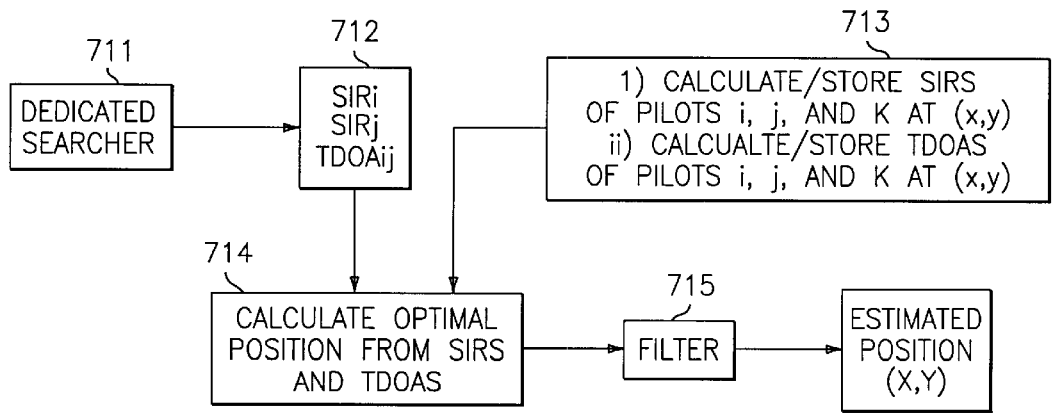
FIG. 7 is a block diagram of an MS locating algorithm when two pilot signals with SIRs greater than the SIR threshold are acquired from one BS according to an embodiment of the present invention.

The second method will be described referring to FIG. 7.

A calculator 712 calculates the SIRs and TDOA, $sir_i$, $sir_j$, and $tdoa_{ij}$ of pilot signals i and j of different BSs received from a dedicated searcher 711. A storage 713 calculates the SIRs of each BS pilot received at any location (x, y) considering all SIR influencing factors including the location, antenna gain, and antenna height of each BS and makes an SIR map. The storage 713 also makes a TDOA map out of the TDOAs of pilots i and j received at any position (x, y). That is, TDOAs of pilots i and j received in the MS at a location (x, y) are calculated and stored. Then, a comparator 714 compares $sir_i$, $sir_j$, and $tdoa_{ij}$ with the SIR and TDOA maps and obtains a best matching location (best matching locations). A filter 715 filters signals representative of the three locations and obtains the final MS location (X, Y). Here, the filter is a moving average filter. As described above, the second method is applied to the case that only two different BS pilots with SIRs greater than the SIR threshold are received. That is, the probable MS locations are expressed as a parabola from the TDOAs of the two pilots and the locations of SIRs approximate to the measured SIRs are detected on the parabola.

Figure 8:
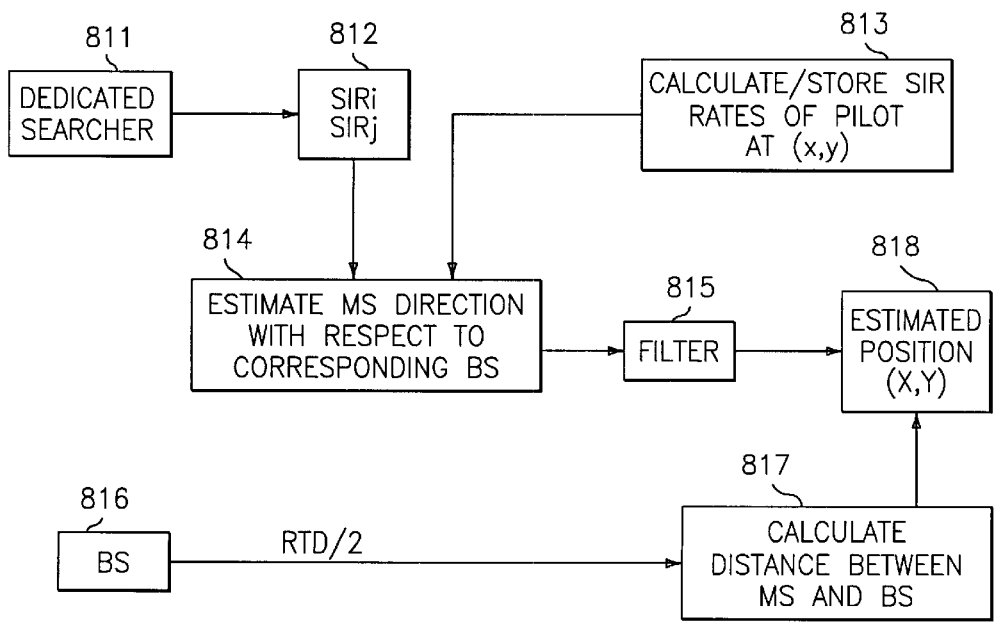
FIG. 8 is a block diagram of an MS locating algorithm using the SIRs and BS-measured RTDs (Round Trip Delay) of two pilot signals when the two pilot signals are acquired from a BS according to an embodiment of the present invention.

The third method will be described referring to FIG. 8.

A calculator 812 calculates the SIRs $sir_i$ and $sir_j$ of pilot signals i and j of a BS received from a dedicated searcher 811. A storage 813 calculates the SIR rates of pilot signal i and j received at any location (x, y) from different sectors of the same BS based on information about sector direction, sector cross-section, and antenna transmission power pattern of the BS, and stores the SIR rate information. Then, a comparator 814 obtains the direction of the MS with respect to the BS from the SIR information, and a filter 815 filters a signal representative of the MS direction and obtains the final MS location. Here, the filter is a moving averaging filter. A distance calculator 817 calculates the distance between the MS and the BS (RTD/2×speed of light) from a BS modem 816. A location estimator 818 estimates the location of the MS with respect to the BS based on the filtered MS direction and the measured distance. As described above, the third method is applied to the case that a sufficient number of pilot signals with SIRs greater than the SIR threshold are not received but two pilots are received from the same BS. That is, the MS direction is estimated with respect to the center of the BS using the SIRs of the two detected pilots and the distance between the BS and the MS is calculated, to thereby estimate the final MS location.

In accordance with the embodiments of the present invention as described above, the MS location is determined using forward channel signals and a dedicated searcher, which is used to produce data efficiently. The dedicated searcher acquires signals from other BSs as well as a serving BS as one way to reduce signal interference, thereby enabling the MS to be located. Furthermore, TDOA-based positioning and SIR-based positioning of the embodiments of the present invention increase the accuracy with which the MS location is determined.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A device for locating a mobile station (MS) having signals received from a plurality of adjacent base stations (BSs) in a mobile communication system, comprising:

an analog-to-digital converter (ADC) for converting the received signals to digital chip sample data;

a memory for storing the chip sample data provided from the ADC for a required measure time;

a dedicated searcher for detecting at least two signals satisfying a threshold from the chip sample data based on a correlation length and a PN (Pseudo Noise) offset, and calculating a signal-to-interference ratio (SIR) and a time difference of arrival (TDOA) of the detected signals; and a controller for outputting the correlation length and the PN offset to the dedicated searcher based on the SIR and TDOA provided from the dedicated searcher.

2. The device as claimed in claim 1, wherein the controller provides the dedicated searcher with at least one correlation length for PN offsets of said adjacent BSs.

3. The device as claimed in claim 2, wherein the threshold is based on the correlation length.

4. The device as claimed in claim 2, wherein the controller increases the correlation length by a predetermined length when the dedicated searcher fails to detect the signals.

5. The device as claimed in claim 1, wherein the dedicated searcher performs correlation on the chip sample data newly stored in the memory with the correlation length used for the previous chip sample data, and, when a specific signal detected by performing correlation exceeds a threshold of the received signal according to said correlation length, performs correlation while decreasing said correlation length until said threshold is satisfied.

6. The device as claimed in claim 1, wherein the controller controls a quantization unit of the ADC according to an SIR from a serving BS out of the adjacent BSs.

7. The device as claimed in claim 1, wherein the dedicated searcher comprises:

a searcher for outputting an SIR and an offset index of a signal satisfying a threshold from the chip sample data based on the correlation length and the PN offset provided from the controller;

a path selector for selecting an offset index corresponding to the earliest path from the offset indexes provided from the searcher and an SIR corresponding to said offset index;

a PN generator for generating a PN code of the corresponding signal based on the PN offset from the controller and the offset index from the path selector;

a decimator for extracting an early sample and a late sample being apart from said early sample by a predetermined chip period on the basis of a specific sample of the chip sample data;

a correlator for outputting an early signal correlation value and a late signal correlation value by performing correlation on the PN code from the PN generator and the early sample and the late sample from the decimator based on the correlation length;

a time tracker for outputting a time offset correction value according to the early signal correlation value and the late signal correlation value;

an accumulator for accumulating the time offset correction value from the time tracker according to the correlation length;

a summation device for correcting the time offset index from the path selector with the time offset correction value accumulated by the accumulator, to output a TDOA; and a reference time compensator for compensating for a reference time error for the TDOA.

8. A device for locating a mobile station (MS) having signals received from a plurality of adjacent base stations (BSs) in a mobile communication system, comprising:

an analog-to-digital converter (ADC) for converting the received signals to digital chip sample data;

a dedicated searcher for detecting at least two signals satisfying a threshold from the chip sample data based on a correlation length and a pseudo noise (PN) offset, and calculating a signal-to-interference ratio (SIR) and a time difference of arrival (TDOA) of the detected signals; and a controller for outputting the correlation length and the PN offset to the dedicated searcher based on the SIR and TDOA provided from the dedicated searcher.

9. The device as claimed in claim 8, wherein the controller provides the dedicated searcher with at least one correlation length for PN offsets of said adjacent BSs.

10. The device as claimed in claim 9, wherein the threshold is based on the correlation length.

11. The device as claimed in claim 8, wherein the controller increases the correlation length by a predetermined length when the dedicated searcher fails to detect the signals.

12. The device as claimed in claim 8, wherein the controller controls a quantization unit of the ADC according to an SIR from a serving BS out of the adjacent BSs.

13. The device as claimed in claim 8, wherein the dedicated searcher comprises:

a searcher for outputting an SIR and an offset index of a signal satisfying a threshold from the chip sample data based on the correlation length and the PN offset provided from the controller;

a path selector for selecting an offset index corresponding to an earliest path from the offset indexes provided from the searcher and an SIR corresponding to said offset index;

a PN generator for generating a PN code of the corresponding signal based on the PN offset from the controller and the offset index from the path selector;

a decimator for extracting an early sample and a late sample being apart from said early sample by a predetermined chip period on the basis of a specific sample of the chip sample data;

a correlator for outputting an early signal correlation value and a late signal correlation value by performing correlation on the PN code from the PN generator and the early sample and the late sample from the decimator depending on the correlation length;

a time tracker for outputting a time offset correction value according to the early signal correlation value and the late signal correlation value;

an accumulator for accumulating the time offset correction value from the time tracker according to the correlation length;

a summation device for correcting the time offset index from the path selector with the time offset correction value accumulated by the accumulator, to output a TDOA; and a reference time compensator for compensating for a reference time error for the TDOA.

14. A method for locating a mobile station (MS) having signals received from a plurality of adjacent base stations (BSs) in a mobile communication system, comprising the steps of:

converting the received signals to digital chip sample data;

detecting at least two signals satisfying a threshold from the chip sample data based on a correlation length and a pseudo noise (PN) offset, and calculating a signal-to-interference ratio (SIR) and a time difference of arrival (TDOA) of the detected signals; and outputting the correlation length and the PN offset based on the SIR and TDOA.

15. The method as claimed in claim 14, wherein in the correlation length output step, at least one correlation length is output for PN offsets of said adjacent BSs.

16. The method as claimed in claim 15, wherein the threshold is based on the correlation length.

17. The method as claimed in claim 14, wherein the correlation length increases by a predetermined length upon failure to detect the signals.

18. The method as claimed in claim 14, wherein a quantization unit for digital conversion is controlled according to an SIR from a serving BS out of the adjacent BSs.

19. The method as claimed in claim 14, wherein the calculating step comprises the steps of:

outputting an SIR and an offset index of a signal satisfying a threshold from the chip sample data based on the correlation length and the PN offset;

selecting an offset index corresponding to an earliest path from the offset indexes provided from the searcher and an SIR corresponding to said offset index;

generating a PN code of the corresponding signal based on the PN offset and the offset index;

extracting an early sample and a late sample being apart from said early sample by a predetermined chip period on the basis of a specific sample of the chip sample data;

outputting an early signal correlation value and a late signal correlation value by performing correlation on the early sample and the late sample depending on the correlation length;

outputting a time offset correction value according to the early signal correlation value and the late signal correlation value;

accumulating the time offset correction value according to the correlation length;

correcting the time offset index with the accumulated time offset correction value, to output a TDOA; and compensating for a reference time error for the TDOA.

20. A method for locating a mobile station (MS) having signals received from a plurality of adjacent base stations (BSs) in a mobile communication system, comprising the steps of:

converting the received signals to digital chip sample data;

storing the chip sample data for a required measure time;

detecting at least two signals satisfying a threshold from the chip sample data based on a correlation length and a pseudo noise (PN) offset, and calculating a signal-to-interference ratio (SIR) and a time difference of arrival (TDOA) of the detected signals; and outputting the correlation length and the PN offset based on the SIR and TDOA.

21. The method as claimed in claim 20, wherein in the correlation length output step, at least one correlation length is output for PN offsets of said adjacent BSs.

22. The method as claimed in claim 21, wherein the threshold is based on the correlation length.

23. The method as claimed in claim 21, wherein the correlation length increases by a predetermined length upon failure to detect the signals.

24. The method as claimed in claim 20, wherein a quantization unit for digital conversion is controlled according to an SIR from a serving BS out of the adjacent BSs.

25. The method as claimed in claim 20, wherein the calculating step comprises the steps of:

outputting an SIR and an offset index of a signal satisfying a threshold from the chip sample data based on the correlation length and the PN offset;

selecting an offset index corresponding to an earliest path from the offset indexes provided from the searcher and an SIR corresponding to said offset index;

generating a PN code of the corresponding signal based on the PN offset and the offset index;

extracting an early sample and a late sample being apart from said early sample by a predetermined chip period on the basis of a specific sample of the chip sample data;

outputting an early signal correlation value and a late signal correlation value by performing correlation on the early sample and the late sample depending on the correlation length;

outputting a time offset correction value according to the early signal correlation value and the late signal correlation value;

accumulating the time offset correction value according to the correlation length;

correcting the time offset index with the accumulated time offset correction value, to output a TDOA; and compensating for a reference time error for the TDOA.

26. A method for locating a mobile station (MS) depending on at least two signals having different PN offsets acquired from digital chip sample data obtained by converting signals received from at least one adjacent base station (BS), the method comprising the steps of:

(a) calculating signal-to-interference ratios (SIRs) and at least one time difference of arrival (TDOA) of the acquired at least two signals;

(b) determining whether the acquired at least two signals are received from the same BS;

(c) locating, when the at least two signals are received from the same BS, the MS based on a direction of the MS and a distance from the base station; and (d) locating, when the at least two signals are received from different BSs, the MS based on the calculated SIRs and at least one TDOA.

27. The method as claimed in claim 26, wherein the step (c) comprises the steps of:

estimating the direction of the MS on the basis of the base station using the SIRs and a SIR map;

calculating the distance between the MS and the BS using a round trip delay (RTD); and locating the MS based on the estimated direction of the MS and the calculated distance.

28. The method as claimed in claim 26, wherein the step (d) comprises the steps of:

determining a parabola representing a probable position of the MS using the calculated at least one TDOA and a TDOA map between the different BSs;

determining a probable position line representing a probable position of the MS using the calculated SIRs and a SIR map between the different BSs; and locating the MS based on an intersecting point of the parabola and the probable position line.

29. The method as claimed in claim 26, further comprising the step of locating, when at least three SIRs and at least three TDOAs are calculated for at least three BS signals, the MS using the calculated at least three SIRs and at least three TDOAs.

30. The method as claimed in claim 28, wherein the position of the MS is estimated by an average of the probable positions constituting the parabola duration between the intersecting points.

* * * * *